United States Patent [19]

Gutman

[11] 3,897,516
[45] July 29, 1975

[54] OXIMINO PHOSPHORUS COMPOUNDS

[75] Inventor: Arnold D. Gutman, Berkeley, Calif.

[73] Assignee: Stauffer Chemical Company, Westport, Conn.

[22] Filed: Apr. 6, 1970

[21] Appl. No.: 26,103

[52] U.S. Cl. ............ 260/940; 260/543 P; 260/944; 260/968; 424/210; 424/211
[51] Int. Cl.² ..................... C07F 9/165; A01N 9/36
[58] Field of Search ............................. 260/940, 944

[56] References Cited
UNITED STATES PATENTS
2,816,128  12/1957  Allen .............................. 260/944 X
2,957,016  10/1960  Diamond ....................... 260/944 X

*Primary Examiner*—Anton H. Sutto
*Attorney, Agent, or Firm*—Edwin H. Baker

[57] ABSTRACT

Compounds having the formula

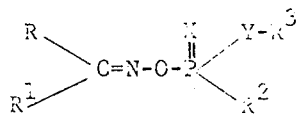

in which X is oxygen or sulfur; Y is oxygen or sulfur; R is alkyl; $R^1$ is alkyl; $R^2$ is alkyl or alkoxy and $R^3$ is (1) phenyl or (2) mono-, di- or tri-substituted phenyl wherein the substituent is (a) nitro, (b) cyano, (c) halogen, (d)

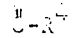

wherein $R^4$ is alkyl, (e) $CF_3$, (f) $SO_2NHR_5$ wherein $R^5$ is alkyl or (g) thiomethyl and their use as insecticides and acaricides are disclosed. Also, the intermediates for preparing the compounds and a method for preparing the intermediates are disclosed.

6 Claims, No Drawings

OXIMINO PHOSPHORUS COMPOUNDS

This invention relates to certain novel chemical compounds, novel intermediates for their preparation, the use of the chemical compounds as insecticides and acaricides and to a process for preparing the intermediates. More particularly, the chemical compounds are certain oximino phosphorus containing compounds.

The compounds of this invention are those having the formula

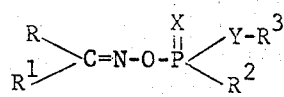

in which
X is oxygen or sulfur; Y is oxygen or sulfur;
R is (1) alkyl having 1 to 8 carbon atoms, preferably branched chain or methyl, more preferably methyl and t-butyl;
$R^1$ is alkyl having 1 to 4 carbon atoms, preferably methyl;
$R^2$ is alkyl having 1 to 4 carbon atoms, preferably 1 to 2 carbon atoms; or alkoxy having 1 to 4 carbon atoms, preferably 1 to 2 carbon atoms;
$R^3$ is (1) phenyl or (2) mono-, di- or tri-substituted phenyl wherein the substituent is (a) nitro, (b) cyano, (c) halogen, preferably chlorine, (d)

wherein $R^4$ is alkyl having 1 to 4 carbon atoms, preferably methyl, (e) $CF_3$, (f) $SO_2NHR_5$ wherein $R^5$ is alkyl having 1 to 4 carbon atoms; or (g) thiomethyl, preferably mono substitution is in the meta or para positions and the substituent is a halogen, nitro, thiomethyl, $CF_3$ or cyano group, di substitution is meta and para or ortho and para and the substituents are both halogen groups and tri-substitution is in the 2,4,5 position and the substituents are all halogen, preferably chlorine. Optionally, such groups as alkyl having 1 to 4 carbon atoms or (h) alkoxy having 1 to 4 carbon atoms can also be substituted on the phenyl, preferably in the meta position.

The compounds of the present invention can be prepared according to the following reactions:

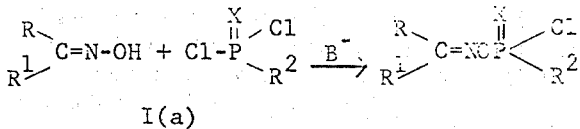

I(a)

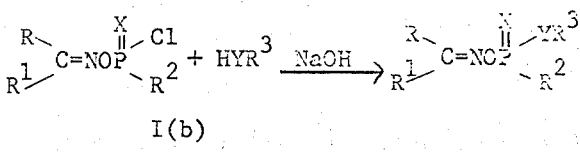

I(b)

in which R, $R^1$, $R^2$, $R^3$, X and Y are as defined.

The process of this invention is represented by reaction I(a) and gives the novel intermediates of this invention. In other words, the process is for preparing a compound having the formula

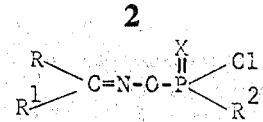

in which R, $R^1$, $R^2$ and X are as defined comprising reacting a compound of the formula

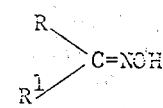

in which R and $R^1$ are as defined with a compound of the formula

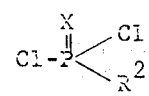

in which $R^2$ and X are as defined.

Preferably, reaction I(a) is carried out by reacting preferably equal mole amounts of the two reactants. If an excess of either reactant is used, the reaction still proceeds but yields are reduced. The reactants can be combined in any desired manner but preferably, the reaction is run in a solvent such as THF by first preparing the salt of the oxime reactant with an acid acceptor such as potassium t-butoxide at room temperature and then preferably slowly adding the dichloride reactant thereto, preferably in solution with a solvent, for example, THF, at a temperature below about 15°C. for control. However, the oxime reactant can be used in place of the salt preferably in the presence of the acid acceptor. The resulting product is recovered and purified by standard procedure. For example, the resulting product can be recovered from the reaction mixture and purified from the reaction mixture by adding the mixture to a non-polar solvent such as benzene. The benzene mixture is then washed with water, dilute NaOH solution and then again by water. The benzene is evaporated after the water has been removed, for example, by treatment with anhydrous $MgSO_4$ to yield the purified product.

The novel intermediate compounds of this invention which are useful in preparing the insecticidal and acaricidal compounds of this invention, for example, by reaction I(b), heretofore described are those having the formula

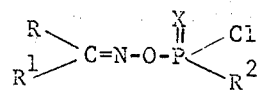

in which X is oxygen or sulfur; R is alkyl having 1 to 8 carbon atoms, preferably branched chain or methyl, more preferably methyl and t-butyl; $R^1$ is alkyl having 1 to 4 carbon atoms, preferably methyl; $R^2$ is alkyl having 1 to 4 carbon atoms, preferably 1 to 2 carbon atoms; or alkoxy having 1 to 4 carbon atoms, preferably 1 to 2 carbon atoms. These intermediate compounds can be prepared according to reaction I(a) specifically described heretofore.

The reaction, reaction I(b), is carried out by reacting preferably equal mole amounts of the two reactants. If an excess of either reactant is used, the reaction still proceeds but yields are reduced. The reactants can be combined in any manner, for example, the phosphorus-containing reactant is slowly added to the phenol or triophenol reactant in a solvent such as THF, preferably with stirring. More preferably, an alkali metal salt of the phenol or thiophenol salt is used to reduce the chance of a violent reaction. The temperature of the reaction is not critical, however, generally better yields are obtained by heating the reactants at reflux for a time sufficient to allow completion of the reaction. The resulting product can be recovered from the reaction mixture and purified by standard procedures. For example, the desired reaction product can be recovered from the reaction mixture by adding the mixture to a non-polar solvent such as benzene. The benzene mixture is then washed with water, dilute NaOH solution and then again by water. The benzene is evaporated after the water has been removed, for example, by treatment with anhydrous $MgSO_4$ to yield the purified product.

Preparation of the compounds of this invention, the intermediate compounds of this invention and the process of this invention for preparing said intermediate compounds are illustrated by the following examples:

EXAMPLE I

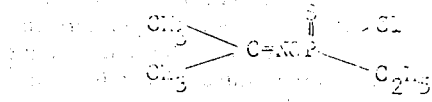

O-(Acetoneoximino), ethyl, thiophosphonyl chloride.

11.2 grams (0.1 moles) of potassium t butoxide is combined with 300 ml. of tetrahydrofuran in a 600 ml. beaker and 7.3 grams (0.1 moles) of acetoneoxime is added. The mixture is stirred at room temperature for 15 minutes. 16.3 grams (0.1 moles) of ethyl phosphonothionic dichloride is combined with 100 ml. of tetrahydrofuran in a 1 liter three-neck flask fitted with a stirrer, thermometer and dropping funnel. The solution is cooled in an ice bath and stirred. The oxime salt solution is added over a period of 15 minutes at such a rate that the temperature does not exceed 15°C. After the addition is complete, the resulting mixture is stirred at room temperature for 1 hour, then poured into 400 ml. of benzene. The benzene mixture is washed with two 300 ml. portions of $H_2O$, dried with anhydrous $MgSO_4$ and evaporated under reduced pressure to yield 15.2 grams (76.2 percent of theory) of O-(acetoneoximino), ethyl, thiophosphonyl chloride. $N_D^{30}$- 1.5184. The compound is characterized by IR and NMR.

EXAMPLE II

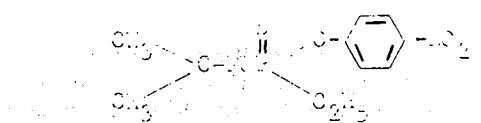

O-(Acetoneoximino), ethyl-(4-nitrophenyl)thionophosphonate.

7 grams (0.0503 moles) of 4-nitrophenol is combined with 2.1 grams (0.0503 moles) of caustic and 25 mil. of water in a 500 ml. three-neck flask fitted with a stirrer, thermometer and dropping funnel. The mixture is stirred and 10 grams (0.0503 moles) of O-(acetoneoximino), ethylthiophosphoryl chloride, obtained in Example I, in 200 ml. of tetrahydrofuran is added over a period of 30 minutes. The resulting mixture is stirred and heated under reflux for 2 hours, cooled and poured into 400 ml. of benzene. The benzene mixture is washed with 200 ml. of $H_2O$, 200 ml. dilute NaOH solution, followed by two 200 ml. portions of $H_2O$. The benzene is dried with anhydrous $MgSO_4$ and evaporated to yield 10.9 grams (72.3% of theory) of the desired compound, O-(acetoneoxmine), ethyl-(4-nitrophenyl)-thiophosphonate. m.p. 82°–87°C. The compound is characterized by IR and NMR.

EXAMPLE III

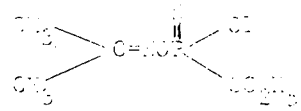

O-(Acetoneoximino) O-ethyl thiophosphoryl chloride.

17.9 grams (0.1 moles) of ethyldichlorothiophosphate is combined with 20 ml. of tetrahydrofuran in a 250 ml. three-neck flask fitted with a stirrer, thermometer and dropping funnel. The solution is stirred and cooled to −10°C. A solution of 9.5 grams (0.13 moles) of acetoneoxime, 4.0 grams (0.1 moles) of caustic, and 20 ml. of water is added to the stirring solution over a period of 30 minutes. The resulting mixture is stirred for 1 hour at 0°C. and 30 mm at room temperature until the mixture becomes neutral to pH paper. The mixture is then poured into 300 ml. of $Et_2O$ and is washed with two 100 ml. portions of $H_2O$. The $Et_2O$ phase is dried with anhydrous $MgSO_4$ and evaporated to yield 21.4 grams (99.9 percent of theory) of the desired compound. $N_D^{30}$- 1.5037. The structure is characterized by IR and NMR.

EXAMPLE IV

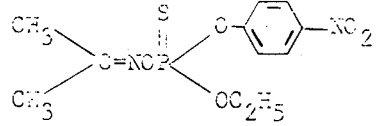

O-(Acetoneoximino)-O-ethyl-O-(4-nitrophenyl) phosphorothioate.

10.0 grams (0.0465 moles) of O-(acetoneoximino), O-ethyl thiophosphoryl chloride obtained in Example III is reacted with 7 grams (0.0503 moles) of 4-nitrophenol and 2.1 grams (0.0503 moles) of caustic in the same manner as Example II to yield 12.6 grams (85.5 percent of theory) of the desired compound. $N_{30}^D$ - 1.5335. Compound is characterized by NMR and IR.

EXAMPLE V

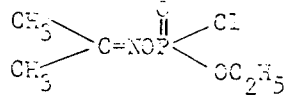

O-(Acetoneoximino) O-ethylphosphorochloridate.

In a 600 ml. beaker, 11.02 grams (0.1 moles) of potassium t-butoxide is combined with 300 ml. of tetrahydrofuran. The mixture is stirred in an ice bath and 7.3 grams (0.1 mole) of acetoneoxime is added over a period of 5 minutes. 16.3 grams (0.1 mole) of ethyldichlorophosphate is combined with 100 ml. of tetrahydrofuran in a 1-liter three-neck flask fitted with a dropping funnel, stirrer and thermometer. The solution is stirred and cooled in an ice bath. The oxime salt is added over a period of 15 minutes at such a rate that the temperature does not exceed 15°C. After the addition is complete, the resulting mixture is stirred at room temperature for 1 hour. 400 ml. of benzene is added and the mixture is washed with two 300 ml. portions of water. The benzene phase is dried with anhydrous magnesium sulfate and evaporated under reduced pressure to yield 16.8 grams (84.3% of theory) of the desired product. $N_D^{30}$- 1.4560. The structure is confirmed by NMR.

EXAMPLE VI

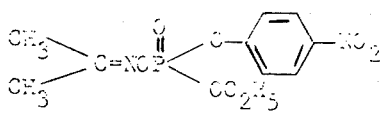

O-(Acetoneoximino) O-ethyl-O-(4-nitrophenyl)phosphate.

10 grams (0.0503 moles) of O-(acetoneoximino) O-ethyl phosphorochloridate is combined with 300 ml. of tetrahydrofuran in a 500 ml. three-neck flask fitted with a stirrer, dropping funnel, thermometer and reflux condenser. The solution is stirred and cooled to 5°C. in an ice bath. 7.0 grams (0.05 moles) of 4-nitrophenol, 2.1 grams (0.0503 moles) of caustic and 25 ml. of water are combined in a 50 ml. beaker. The resulting salt solution is added to the chloridate at such a rate that the temperature does not exceed 15°C. The resulting mixture is stirred at room temperature for 1 hour and is heated under reflux for 1 hour. The mixture is cooled to room temperature and 400 ml. of benzene is added. The mixture is washed in turn with 200 ml. of water, 200 ml. dilute caustic and two 200 ml. portions of water. The benzene phase is dried with anhydrous magnesium sulfate and evaporated under reduce of pressure to yield 10.5 grams (69.5% of theory) of the desired compound. $N_D^{30}$- 1.5280. The structure is confirmed by the infrared spectrum.

EXAMPLE VII

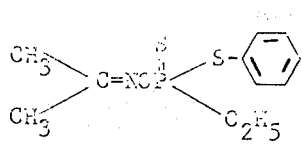

O-(Acetoneoximino) ethyl-S-phenylphosphonodithioate. -S-phenylphosphonodithioate.

5.5 grams (0.0505 moles) of thiophenol is combined with 2.1 grams (0.0503 moles) of caustic and 25 ml. of water in a 500 ml. three-neck flask fitted with a stirrer, thermometer and dropping funnel. The mixture is stirred and 10 grams (0.0503 moles) of O-(acetoneoximino) ethylthiophosphoryl chloride, obtained in Example I, in 200 ml. tetrahydrofuran is added over a period of 30 minutes. The resulting mixture is stirred and heated under reflux for 2 hours, cooled and poured into 400 ml. of benzene. The benzene mixture is washed with 200 ml. of water, 200 ml. of dilute caustic solution, followed by two 200 ml. portions of water. The benzene phase is dried with anhydrous $MgSO_4$ and evaporated under reduced pressure to yield 10.8 grams (79.2% of theory) of the desired compound. $N_D^{30}$- 1.5830. The compound is characterized by IR.

EXAMPLE VIII

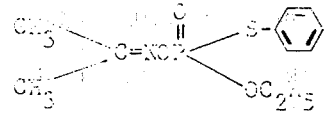

O-(Acetoneoximino) O-ethyl-S-phenylphosphorothioate.

5.5 grams (0.0505 moles) of thiophenol is combined with 2.1 grams (0.0503 moles) of caustic and 25 ml. of water in a 500 ml. three-neck flask fitted with a stirrer, thermometer, and dropping funnel. The mixture is stirred and 10 grams (0.0503 moles of O-(acetoneoximino) O-ethylphosphorochloridate, obtained in Example V, in 200 ml. of tetrahydrofuran is added over a period of 30 minutes. The resulting mixture is stirred and heated under reflux for 2 hours, cooled and poured into 400 ml. of benzene. The benzene mixture is washed with 200 ml. of water, 200 ml. of dilute caustic solution, followed by two 200 ml. portions of water. The benzene phase is dried with anhydrous $MgSO_4$ and evaporated under reduced pressure to yield 6.5 grams (50.5 percent of theory) of the desired compound. $N_D^{30}$- 1.5642. The compound is characterized by IR and NMR.

The following is a table of certain selected compounds that are preparable according to the procedure described hereto. Compound numbers are assigned to each compound and are used throughout the remainder of the application.

TABLE I

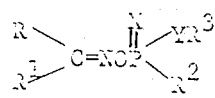

| Compound Number | R | $R^1$ | $R^2$ | X | Y | $R^3$ | m.p.°C or $N_D^{30}$ |
|---|---|---|---|---|---|---|---|
| 1[a] | $CH_3$ | $CH_3$ | $C_2H_5$ | S | O | –⟨⟩–$NO_2$ | 82–87 |
| 2 | $CH_3$ | $CH_3$ | $C_2H_5$ | S | O | –⟨⟩–$NO_2$ (CH_3) | 71–74 |
| 3 | $CH_3$ | $CH_3$ | $C_2H_5$ | S | O | –⟨⟩–CN | 74–76 |
| 4[b] | $CH_3$ | $CH_3$ | $C_2H_5$ | S | S | –⟨⟩ | 1.5830 |

TABLE I - CONTINUED

| Compound Number | R | R¹ | R² | X | Y | R³ | m.p °C or $N_D^{30}$ |
|---|---|---|---|---|---|---|---|
| 5 | $CH_3$ | $CH_3$ | $C_2H_5$ | S | O | 2,4,5-trichlorophenyl | 1.5510 |
| 6 | $CH_3$ | $CH_3$ | $C_2H_5$ | S | O | 4-methylphenyl | 1.5342 |
| 7 | $CH_3$ | $CH_3$ | $C_2H_5$ | S | O | 2,4-dichlorophenyl | 1.5515 |
| 8 | $CH_3$ | $CH_3$ | $C_2H_5$ | S | O | 2-chloro-4-nitrophenyl | 1.5614 |
| 9 | $(CH_3)_2CH$ | $CH_3$ | $C_2H_5$ | S | S | phenyl | 1.5713 |
| 10 | $CH_3$ | $CH_3$ | $C_2H_5$ | S | O | 4-SCH₃-phenyl | 1.5788 |
| 11 | $CH_3$ | $CH_3$ | $C_2H_5$ | S | S | 4-chlorophenyl | 1.5895 |
| 12 | $CH_3$ | $CH_3$ | $C_2H_5$ | S | O | 2-methyl-4-chlorophenyl | 1.5430 |
| 13ᶜ | $CH_3$ | $CH_3$ | $OC_2H_5$ | O | O | 4-nitrophenyl | 1.5280 |
| 14 | $CH_3$ | $CH_3$ | $OC_2H_5$ | O | O | 4-methylphenyl | 1.4998 |
| 15 | $C_2H_5$ | $CH_3$ | $C_2H_5$ | S | O | 4-nitrophenyl | 1.5400 |
| 16 | $C_2H_5$ | $CH_3$ | $OC_2H_5$ | O | O | 4-nitrophenyl | 1.5030 |
| 17 | $C_2H_5$ | $CH_3$ | $C_2H_5$ | S | O | 2,4,5-trichlorophenyl | 1.5417 |
| 18 | $C_2H_5$ | $CH_3$ | $C_2H_5$ | S | O | 4-methylphenyl | 1.5284 |
| 19 | $C_2H_5$ | $CH_3$ | $C_2H_5$ | S | O | 2-methyl-4-nitrophenyl | 1.5400 |
| 20ᵈ | $CH_3$ | $CH_3$ | $OC_2H_5$ | S | O | 4-nitrophenyl | 1.5335 |
| 21 | $CH_3$ | $CH_3$ | $OC_2H_5$ | S | O | 4-cyanophenyl | 1.5305 |
| 22 | $CH_3$ | $CH_3$ | $OC_2H_5$ | S | O | 2-methyl-4-nitrophenyl | 1.5260 |
| 23 | $CH_3$ | $CH_3$ | $OC_2H_5$ | S | S | 4-chlorophenyl | 1.5483 |
| 24 | $C_2H_5$ | $CH_3$ | $OC_2H_5$ | O | O | 2-methyl-4-nitrophenyl | 1.5038 |
| 25 | $CH_3$ | $CH_3$ | $OC_2H_5$ | O | O | 4-cyanophenyl | 1.5108 |
| 26 | $CH_3$ | $CH_3$ | $OC_2H_5$ | O | O | 2-methyl-4-nitrophenyl | 1.5200 |
| 27 | $CH_3$ | $CH_3$ | $OC_2H_5$ | O | O | 2,4,5-trichlorophenyl | 1.5436 |
| 28 | $(CH_3)_2CH$ | $CH_3$ | $C_2H_5$ | S | O | 4-nitrophenyl | 1.5443 |
| 29 | $(CH_3)_3C-$ | $CH_3$ | $C_2H_5$ | S | O | 4-nitrophenyl | semi-solid |
| 30 | $(CH_3)_3C-$ | $CH_3$ | $C_2H_5$ | S | O | 2-methyl-4-nitrophenyl | 1.5275 |

TABLE I - CONTINUED

| Compound Number | R | R¹ | R² | X | Y | R³ | m.p °C or $N_D^{30}$ |
|---|---|---|---|---|---|---|---|
| 31 | $(CH_3)_3C-$ | $CH_3$ | $C_2H_5$ | S | O |  | 1.5225 |
| 32 | $(CH_3)_3C-$ | $CH_3$ | $C_2H_5$ | S | S |  | 1.5460 |
| 33 | $CH_3$ | $CH_3$ | $OC_2H_5$ | S | S |  | 1.5150 |
| 34 | $CH_3$ | $CH_3$ | $OC_2H_5$ | S | O |  | 1.5448 |
| 35 | $CH_3$ | $CH_3$ | $OC_2H_5$ | S | O |  | 1.5417 |
| 36 | $CH_3$ | $CH_3$ | $C_2H_5$ | S | O |  | 1.5695 |
| 37 | $CH_3$ | $CH_3$ | $C_2H_5$ | S | O |  | 1.5540 |
| 38 | $CH_3$ | $CH_3$ | $C_2H_5$ | S | O |  | 1.5305 |
| 39 | $CH_3$ | $CH_3$ | $OCH_3$ | S | O |  | 1.5540 |
| 40 | $CH_3$ | $CH_3$ | $OCH_3$ | S | O |  | 1.5420 |
| 41 | $CH_3$ | $CH_3$ | $OCH_3$ | O | O |  | 1.5205 |
| 42 | $CH_3$ | $CH_3$ | $OCH_3$ | O | O |  | 1.5100 |
| 43 | $CH_3$ | $CH_3$ | $C_2H_5$ | S | O |  | 100–104° |
| 44 | $CH_3$ | $CH_3$ | $OC_2H_5$ | O | O |  | 1.5172 |
| 45 | $CH_3$ | $CH_3$ | $OCH_3$ | O | O |  | 100–105° |
| 46 | $CH_3$ | $CH_3$ | $CH_3$ | S | O |  | 94–98 |
| 47 | $CH_3$ | $CH_3$ | $CH_3$ | S | O |  | 1.5570 |
| 48 | $CH_3$ | $CH_3$ | $CH_3$ | S | O |  | 1.5560 |
| 49 | $CH_3$ | $CH_3$ | $CH_3$ | S | O |  | 1.5595 |
| 50 | $(CH_3)_3C-$ | $CH_3$ | $C_2H_5$ | S | S |  | 1.5743 |
| 51 | $(CH_3)_3C-$ | $CH_3$ | $C_2H_5$ | S | O |  | 1.5413 |
| 52 | $(CH_3)_3C-$ | $CH_3$ | $CH_3$ | S | S |  | 1.5717 |
| 53 | $(CH_3)_3C-$ | $CH_3$ | $CH_3$ | S | O |  | 1.5400 |

TABLE I - CONTINUED

| Compound Number | R | R¹ | R² | X | Y | R³ | m.p. °C or $N_D^{30}$ |
|---|---|---|---|---|---|---|---|
| 54 | $(CH_3)_3C-$ | $CH_3$ | $CH_3$ | S | O | 4-$NO_2$-$C_6H_4$ | 102-103 |
| 55 | $(CH_3)_3CCH_2$ | $CH_3$ | $C_2H_5$ | S | O | 4-$NO_2$-$C_6H_4$ | 1.5340 |
| 56 | $(CH_3)_3CCH_2$ | $CH_3$ | $C_2H_5$ | S | O | 2-$CH_3$-4-$NO_2$-$C_6H_3$ | 1.5300 |
| 57 | $(CH_3)_3CCH_2$ | $CH_3$ | $C_2H_5$ | S | O | 2,4,5-$Cl_3$-$C_6H_2$ | 1.5380 |
| 58 | $(CH_3)_3CCH_2$ | $CH_3$ | $C_2H_5$ | S | O | 4-$CN$-$C_6H_4$ | 1.5230 |
| 59 | $(CH_3)_2CH$ | $CH_3$ | $C_2H_5$ | S | O | 4-$NO_2$-$C_6H_4$ | 1.5405 |
| 60 | $CH_3$ | $CH_3$ | $CH_3$ | S | S | 4-$Cl$-$C_6H_4$ | 71-73 |
| 61 | $CH_3$ | $CH_3$ | $CH_3$ | S | O | 4-$CN$-$C_6H_4$ | 1.5540 |
| 62 | $CH_3$ | $CH_3$ | $CH_3$ | S | O | 2-$Cl$-4-$C(CH_3)_3$-$C_6H_3$ | 1.5380 |
| 63 | $(CH_3)_2CHCH_2$ | $CH_3$ | $C_2H_5$ | S | O | 2-$CH_3$-4-$NO_2$-$C_6H_3$ | 1.5370 |
| 64 | $(CH_3)_2CHCH_2$ | $CH_3$ | $C_2H_5$ | S | S | $C_6H_5$ | 1.5690 |
| 65 | $(CH_3)_2CHCH_2$ | $CH_3$ | $C_2H_5$ | S | O | 4-$CN$-$C_6H_4$ | 1.5299 |
| 66 | $(CH_3)_2CHCH_2$ | $CH_3$ | $C_2H_5$ | S | O | 2,4,5-$Cl_3$-$C_6H_2$ | 1.5365 |
| 67 | $C_2H_5$ | $C_2H_5$ | $C_2H_5$ | S | O | 2-$CH_3$-4-$NO_2$-$C_6H_3$ | 1.5440 |
| 68 | $C_2H_5$ | $C_2H_5$ | $C_2H_5$ | S | O | 4-$NO_2$-$C_6H_4$ | 1.5397 |
| 69 | $C_2H_5$ | $C_2H_5$ | $C_2H_5$ | S | S | $C_6H_5$ | 1.5730 |
| 70 | $C_2H_5$ | $C_2H_5$ | $C_2H_5$ | S | O | 4-$CN$-$C_6H_4$ | 1.5350 |
| 71 | $(CH_3)_3C-$ | $CH_3$ | $C_2H_5$ | S | O | 4-$Br$-$C_6H_4$ | 1.5380 |
| 72 | $(CH_3)_3C-$ | $CH_3$ | $C_2H_5$ | S | O | 4-$Cl$-$C_6H_4$ | 1.5258 |
| 73 | $(CH_3)_3C-$ | $CH_3$ | $C_2H_5$ | S | O | 4-$COCH_3$-$C_6H_4$ | 1.5285 |
| 74 | $(CH_3)_3C-$ | $CH_3$ | $C_2H_5$ | S | O | 2,6-$(CH_3)_2$-4-$Cl$-$C_6H_2$ | 1.5244 |
| 75 | $(CH_3)_3C-$ | $CH_3$ | $C_2H_5$ | S | O | 2-$CH_3$-4-$Cl$-$C_6H_3$ | 1.5260 |
| 76 | $(CH_3)_3C-$ | $CH_3$ | $C_2H_5$ | S | O | 2,4-$Cl_2$-$C_6H_3$ | 1.5272 |
| 77 | $(CH_3)_3C-$ | $CH_3$ | $C_2H_5$ | S | O | 2-$Cl$-4-$NO_2$-$C_6H_3$ | 1.5300 |

TABLE I - CONTINUED

| Compound Number | R | $R^1$ | $R^2$ | X | Y | $R^3$ | m.p. °C or $N_D^{30}$ |
|---|---|---|---|---|---|---|---|
| 78 | $(CH_3)_3C-$ | $CH_3$ | $CH_3$ | S | O | -C$_6$H$_4$-NO$_2$ | 1.5190 |
| 79 | $(CH_3)_3C-$ | $CH_3$ | $CH_3$ | S | O | -C$_6$H$_4$-Cl | 1.5215 |
| 80 | $(CH_3)_3C-$ | $CH_3$ | $CH_3$ | S | O | -C$_6$H$_3$(Cl)(Cl)-Cl | 1.5258 |
| 81 | $(CH_3)_3C-$ | $CH_3$ | $CH_3$ | S | S | -C$_6$H$_5$ | 1.5642 |
| 82$^e$ | $CH_3$ | $CH_3$ | $OC_2H_5$ | O | S | -C$_6$H$_5$ | 1.5642 |
| 83 | $CH_3$ | $CH_3$ | $C_2H_5$ | S | O | -C$_6$H$_4$-CF$_3$ | 1.5005 |
| 84 | $CH_3$ | $CH_3$ | $C_2H_5$ | S | O | -C$_6$H$_4$-I | 1.5894 |
| 85 | $CH_3$ | $CH_3$ | $C_2H_5$ | S | O | -C$_6$H$_4$-F | 1.5240 |
| 86 | $CH_3$ | $CH_3$ | $C_2H_5$ | S | O | -C$_6$H$_4$-SO$_2$NH-CH$_3$ | 1.5480 |

$^a$Compound No. 1 prepared in Example II
$^b$Compound No. 4 prepared in Example VII
$^c$Compound No. 13 prepared in Example VI
$^d$Compound No. 20 prepared in Example IV
$^e$Compound No. 82 prepared in Example VIII The following tests illustrate utility of the compounds as insecticides and acaricides.

INSECTICIDAL EVALUATION TESTS

The following insect species were used in evaluation tests for insecticidal activity:
1. Housefly (HF) — *Musca domestica* (Linn.)
2. German Roach (GR) — *Blatella germanica* (Linn.)
3. Salt-Marsh Caterpillar (SMC) — *Estigmene acrea* (Drury)
4. Lygus Bug (LB) — *Lygus hesperus* (Knight)
5. Bean Aphid (BA) — *Aphis fabae* (Scop.)

The Housefly (HF) was used in evaluation tests of selected compounds as insecticides by the following procedure. A stock solution containing 100 ug/ml of the toxicant in an appropriate solvent was prepared. Aliquots of this solution were combined with 1 milliliter of an acetone-peanut oil solution in an aluminum dish and allowed to dry. The aliquots were there to achieve desired toxicant concentration ranging from 100 ug per dish to that at which 50 percent mortality was attained. The dishes were placed in a circular cardboard cage, closed on the bottom with cellophane and covered on top with cloth netting. Twenty-five female houseflies, 3 to 5 days old, were introduced into the cage and the percent mortality was recorded after 48 hours. The LD–50 values are expressed in terms of ug per 25 female flies. The results of these insecticidal evaluation tests are given in Table II under "HF."

In the German Cockroach (GR) tests, 10, 1-month old nymphs were placed in separate circular cardboard cages sealed on one end with cellophane and covered by a cloth netting on the other. Aliquots of the toxicants, dissolved in an appropriate solvent, were diluted in water containing 0.002 percent of a wetting agent, Sponto 221$^R$, — (a polyoxyether of alkylated phenols blended with organic sulfonates). Test concentrations ranged from 0.1 percent downward to that at which 50 percent mortality was obtained. Each of the aqueous suspensions of the candidate compounds was sprayed onto the insects through the cloth netting by means of a hand-spray gun. Percent mortality in each case was recorded after 72 hours, and the LD–50 values expressed as percent of toxicant in the aqueous spray were recorded. These values are reported under the column "GR" in Table II.

For testing the Salt Marsh Caterpillar, test solutions were prepared in an identical manner and at concentrations the same as for the German Cockroach above. Sections of bitter dock (*Rumex obtusifolus*)leaves, 1 – 1.5 inches in length were immersed in the test solutions for 10 to 15 seconds and placed on a wire screen to dry. The dried leaf was placed on a moistened piece of filter paper in a Petri dish and infested with 5 — 3rd Instar larvae. Mortality of the larvae was recorded after 72 hours and the LD–50 values are expressed as percent active ingredient in the aqueous suspension.

The Lygus Bug (LB) *Lygus hesperus* was tested similarly as the German Cockroach. The caged insects were sprayed with the candidate compounds at concentrations ranging from 0.05% downward to that at which 50 percent mortality was obtained. After twenty-four and 72 hours, counts were made to determine living and dead insects. The LD–50 (percent) values were calculated. These values are reported under the column "LB" in Table II.

The insect species black bean aphid (BA) *Aphis fabae* (Scop.) - was also employed in the test for insecticidal activity. Young nasturtium (*Tropaeolum* sp.) plants, approximately 2 to 3 inches tall, were used as the host plants for the bean aphid. The host plant was infested with approximately 50 – 75 of the aphids. The test chemical was dissolved in acetone, added to water which contained a small amount of Sponto 221$^R$, an emulsifying agent. The solution was applied as a spray to the infested plants. Concentrations ranged from 0.05 percent downward until an $LD_{50}$ value was achieved. These results are given in Table II under the column "BA."

ACARICIDAL EVALUATION TEST

The two-spotted mite (2SM), *Tetranychus urticae* (Koch), was employed in tests for miticides. Young pinto bean plants or lima bean plants (*Phaseolus sp.*) in the primary leaf stage were used as the host plants. The young pinto bean plants were infested with about 100 mites of various ages. Dispersions of candidate materials were prepared by dissolving 0.1 gram in 10 ml. of a suitable solvent, usually acetone. Aliquots of the toxicant solutions were suspended in water containing 0.002 percent v/v Sponto 221$^R$, polyoxyethylene ether sorbitan monolaurate, an emulsifying agent, the amount of water being sufficient to give concentrations of active ingredient ranging from 0.05 percent to that at which 50 percent mortality was obtained. The test suspensions were then sprayed on the infested plants to the point of run off. After seven days, mortalities of post-embryonic and ovicidal forms were determined. The percentage of kill was determined by comparison with control plants which had not been sprayed with the candidate compounds. The LD–50 values were calculated using well-known procedures. These values are reported under the columns "2SM-PE" and "2SM-Eggs" in Table II.

SYSTEMIC EVALUATION TEST

This test evaluates the root absorption and upward translocation of the candidate systemic compound. The two-spotted mite (2SM), *Tetranychus urticae* (Koch) and the Bean Aphid (BA), *Aphis fabae* (Scop.) were employed in the test for systemic activity.

Young pinto bean plants in the primary leaf stage were used as host plants for the two-spotted mite. The pinto bean plants were placed in bottles containing 200 ml. of the test solution and held in place with cotton plugs. Only the roots were immersed. The test solutions were prepared by dissolving the compounds to be tested in a suitable solvent, usually acetone, and then diluting with distilled water. The final acetone concentration never exceeded about 1 percent. The toxicants were initially tested at a concentration of 10 parts per million (p.p.m.). Immediately after the host plant was placed in the test solution it was infested with the test species. Mortalities were determined after 7 days.

Young nasturtium plants were used as the host plants for the bean aphid. The host plants were transplanted into one pound of soil that had been treated with the candidate compound. Immediately after planting in the treated soil the plants were infested with the aphids. Concentrations of toxicant in the soil ranged from 10 p.p.m. per pound of soil downward until an LD–50 value was obtained. Mortality was recorded after 72 hours.

The percentage of kill of each test species was determined by comparison with control plants placed in distilled water or untreated soil. The LD–50 values were calculated. These systemic test results are reported in Table II under the columns "BA-sys" and "2SM-sys."

TABLE II

| Compound Number | HF ug | GR % | LB % | SMC % | BA % | BA-SYS p.p.m. | PE % | Two-Spotted Mites EGGS % | SYS p.p.m. |
|---|---|---|---|---|---|---|---|---|---|
| 1 | 1.8 | .01 | .001 | .1 | .003 | >10.0 | .01 | .03 | >10 |
| 2 | 5 | .03 | .001 | .05 | .003 | >10.0 | .03 | >.05 | >10 |
| 3 | 2 | .005 | .003 | .05 | .0005 | 8.0 | .005 | .008 | 10 |
| 4 | 10 | .03 | .001 | .03 | .001 | >10.0 | .005 | >.05 | >10 |
| 5 | 10 | .05 | .003 | >.1 | .003 | >10.0 | .005 | >.05 | >10 |
| 6 | >100 | >.1 | >.05 | >.1 | .03 | >10.0 | .05 | .05 | >10 |
| 7 | 12 | .05 | .01 | >.1 | .003 | >10.0 | .03 | >.05 | >10 |
| 8 | 5 | .05 | .001 | >.1 | .003 | >10.0 | .01 | >.05 | >10 |
| 9 | 10 | .1 | .01 | .01 | .003 | >10.0 | .008 | >.05 | >10 |
| 10 | 70 | .03 | .001 | >.1 | .001 | >10.0 | .003 | .03 | >10 |
| 11 | 13 | .05 | .01 | .03 | .008 | >10.0 | .01 | >.05 | >10 |
| 12 | 80 | >.1 | >.05 | >.1 | .05 | | | >.05 | >.05 |
| 13 | 2 | .03 | .001 | .05 | .0005 | >10.0 | | >.05 | >.05 |
| 14 | >100 | | | >.1 | >.05 | | | >.05 | >.05 |
| 15 | 30 | >.1 | .01 | >.1 | .008 | >10.0 | .05 | .05 | |
| 16 | 11 | >.1 | .008 | .05 | .005 | >10.0 | .05 | >.05 | |
| 17 | 28 | .1 | .008 | .1 | .008 | >10.0 | .03 | >.05 | >10 |
| 18 | 100 | >.1 | >.05 | >.1 | .03 | >10.0 | >.05 | >.05 | >10 |
| 19 | 15 | .03 | .003 | .05 | .001 | >10.0 | .03 | .03 | >10 |
| 20 | 20 | >.1 | .01 | >.1 | .003 | >10.0 | >.05 | >.05 | |
| 21 | 5 | >.1 | .008 | >.1 | .003 | >10.0 | >.05 | >.05 | |
| 22 | 12 | .1 | .03 | >.1 | .003 | >10.0 | >.05 | >.05 | |
| 23 | 40 | >.1 | .05 | >.1 | >.05 | | >.05 | >.05 | |
| 24 | 7 | .1 | .05 | >.1 | .003 | >10.0 | >.05 | >.05 | |
| 25 | 5.6 | .03 | .003 | >.1 | .003 | >10.0 | >.05 | >.05 | |
| 26 | 3.7 | .03 | .005 | .1 | .0005 | >10.0 | .05 | >.05 | |
| 27 | 30 | .08 | >.05 | .08 | .003 | >10.0 | >.05 | >.05 | |
| 28 | 30 | .1 | .05 | .03 | .003 | >10.0 | >.05 | >.05 | >10 |
| 29 | 5 | .03 | .003 | .03 | .0003 | >10.0 | .0008 | .03 | >10 |
| 30 | 30 | .05 | .003 | .005 | .003 | >10.0 | .001 | .03 | >10 |
| 31 | 7.5 | .05 | .003 | .01 | .003 | >10.0 | .003 | .03 | >10 |
| 32 | 30 | .03 | .008 | .005 | .003 | >10.0 | .003 | .03 | >10 |
| 33 | 30 | >.1 | .03 | >.1 | .03 | >10.0 | >.05 | >.05 | |
| 34 | 30 | >.1 | .03 | >.1 | .03 | >10.0 | >.05 | >.05 | |
| 35 | 40 | >.1 | >.05 | >.1 | .03 | >10.0 | .03 | >.05 | |
| 36 | 30 | >.1 | .03 | >.1 | .008 | >10.0 | .03 | >.05 | |
| 37 | 100 | >.1 | >.05 | >.1 | .03 | >10.0 | >.05 | >.05 | |
| 38 | 100 | >.1 | >.05 | >.1 | >.05 | | >.05 | >.05 | |
| 39 | 73 | >.1 | >.05 | >.1 | .008 | >10.0 | .05 | .05 | >10 |
| 40 | 30 | >.1 | .03 | >.1 | .003 | >10.0 | .05 | >.05 | >10 |

TABLE II - CONTINUED

| | | | | LD$_{50}$ VALUES | | | | Two-Spotted Mites | |
|---|---|---|---|---|---|---|---|---|---|
| Compound Number | HF ug | GR % | LB % | SMC % | BA % | BA-SYS p.p.m. | PE % | EGGS % | SYS p.p.m. |
| 41 | 5 | .03 | .003 | .05 | .0005 | >10.0 | .03 | >.05 | >10 |
| 42 | 3 | .03 | .001 | >.1 | .001 | >10.0 | .05 | .05 | >10 |
| 43 | 30 | >.1 | .008 | >.1 | .008 | >10.0 | .01 | .03 | >10 |
| 44 | 67 | >.1 | .03 | >.1 | >.05 | | >.05 | >.05 | |
| 45 | 8 | >.1 | .005 | >.1 | .003 | >10.0 | >.05 | >.05 | |
| 46 | 30 | .1 | .008 | >.1 | .003 | 8.0 | .01 | .03 | >10 |
| 47 | 10 | .05 | .005 | .1 | .005 | 10.0 | .003 | .01 | >10 |
| 48 | 24 | .03 | .008 | .01 | .005 | 3.0 | .008 | .03 | 8 |
| 49 | 7 | .08 | .008 | .05 | .003 | 10.0 | .003 | >.05 | >10 |
| 50 | 15 | >.1 | .01 | .005 | .001 | >10.0 | .005 | .03 | >10 |
| 51 | 30 | >.1 | .05 | .03 | .003 | >10.0 | .003 | >.05 | >10 |
| 52 | 14 | .03 | .03 | .03 | .003 | 10.0 | .003 | >.05 | >10 |
| 53 | 8 | .03 | .003 | .003 | .001 | >10.0 | .001 | .003 | >10 |
| 54 | 3 | .005 | .003 | .003 | .001 | >10.0 | .001 | .003 | >10 |
| 55 | 30 | >.1 | .01 | .03 | .003 | >10.0 | .003 | .03 | >10 |
| 56 | 45 | >.1 | .03 | .03 | .008 | >10.0 | .01 | .03 | >10 |
| 57 | 90 | >.1 | >.05 | >.1 | .03 | >10.0 | .03 | >.05 | >10 |
| 58 | 15 | .08 | .03 | .05 | .03 | >10.0 | .001 | .03 | >10 |
| 59 | 30 | .08 | .01 | .03 | .003 | >10.0 | .03 | >.05 | >10 |
| 60 | 7 | .03 | .003 | .03 | .003 | >10.0 | .001 | .03 | >10 |
| 61 | 3 | .03 | .001 | .05 | .003 | 5.0 | .003 | .03 | 3 |
| 62 | 70 | >.1 | .05 | >.1 | .03 | 10.0 | .008 | >.05 | >10 |
| 63 | 30 | >.1 | >.05 | >.1 | .03 | >10.0 | .05 | >.05 | >10 |
| 64 | 12 | .1 | .05 | >.1 | .003 | >10.0 | .005 | >.05 | >10 |
| 65 | 30 | .1 | .03 | >.1 | .005 | >10.0 | .03 | >.05 | >10 |
| 66 | 60 | >.1 | >.05 | >.1 | .05 | >10.0 | >.05 | >.05 | >10 |
| 67 | 30 | .08 | .01 | .01 | .001 | >10.0 | .03 | .03 | >10 |
| 68 | 40 | .1 | .05 | .01 | .003 | >10.0 | >.05 | >.05 | >10 |
| 69 | 12 | .1 | .005 | .01 | .0003 | >10.0 | .03 | >.05 | >10 |
| 70 | 8 | .03 | .005 | .01 | .0008 | >10.0 | .008 | >.05 | >10 |
| 71 | 30 | >.1 | .005 | .03 | .03 | >10.0 | >.05 | >.05 | |
| 72 | 30 | >.1 | .008 | >.1 | .03 | >10.0 | >.05 | >.05 | |
| 73 | 30 | >.1 | >.05 | >.1 | >.05 | | >.05 | >.05 | |
| 74 | >100 | | | >.1 | >.05 | | >.05 | >.05 | |
| 75 | 90 | >.1 | >.05 | >.1 | >.05 | | .05 | >.05 | |
| 76 | 30 | >.1 | .03 | .01 | .003 | >10.0 | .05 | .05 | >10 |
| 77 | 30 | >.1 | .008 | .003 | .003 | >10.0 | .005 | >.05 | >10 |
| 78 | 6 | .005 | .001 | .005 | .001 | >10.0 | .003 | .03 | >10 |
| 79 | 30 | >.1 | .001 | .03 | .008 | >10.0 | >.05 | >.05 | |
| 80 | 9 | >.1 | .005 | .003 | .001 | >10.0 | .03 | >.05 | >10 |
| 81 | 15 | .03 | .03 | .008 | .0008 | >10.0 | .003 | .03 | >10 |
| 82 | 50 | >.1 | .05 | >.1 | .008 | >10.0 | .05 | >.05 | >10 |
| 83 | 3 | >.1 | .03 | >.1 | .03 | >10.0 | .05 | >.05 | |
| 84 | 3 | .03 | .01 | .008 | .03 | >10.0 | .03 | .03 | >10 |
| 85 | 10 | >.1 | >.05 | .1 | .03 | >10.0 | >.05 | >.05 | |
| 86 | >100 | >.1 | | >.1 | >.05 | | >.05 | >.05 | |

As those in the art are well aware, various techniques are available for incorporating the active component or toxicant in suitable pesticidal compositions. Thus, the pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cottonseed and so forth.

Liquid compositions are also useful and normally comprise a dispersion of the toxicant in a liquid media, although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous media and such compositions may be produced by forming a concentrated solution of the toxicant in a suitable organic solvent followed by dispersion in water, usually with the aid of surface active agents. The latter, which may be the anionic, cationic, or nonionic types, are exemplified by sodium stearate, potassium oleate and other alkaline metal soaps and detergents such as sodium lauryl sulfate, sodium naphthalene sulfonate, sodium alkyl naphthalene, sulfonate, methyl cellulose, fatty alcohol ethers, polyglycol fatty acid esters and other polyoxyethylene surface active agents. The proportion of these agents commonly comprises 1 - 15 percent by weight of the pesticidal compositions although the proportion is not critical and may be varied to suit any particular situation.

I claim:

1. A compound having the formula

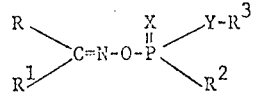

in which X is sulfur, Y is oxygen, R is alkyl having 1 to 4 carbon atoms, $R^1$ is methyl, $R^2$ is alkyl having 1 to 2 carbon atoms, and $R^3$ is 4-cyanophenyl.

2. The compound of claim 1 in which R is methyl, $R^1$ is methyl and $R^2$ is ethyl.

3. A compound having the formula

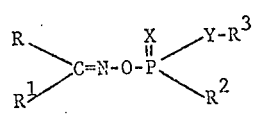

in which X is sulfur, Y is oxygen, R is alkyl having 1 to 4 carbon atoms, $R^1$ is methyl, $R^2$ is alkyl having 1 to 2 carbon atoms, and $R^3$ is 2,4,5-trichlorophenyl.

4. The compound of claim 3 in which R is methyl, $R^1$ is methyl and $R^2$ is ethyl.

5. A compound having the formula

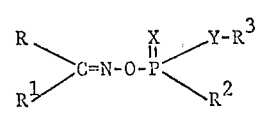

in which X is sulfur, Y is sulfur, R is alkyl having 1 to 4 carbon atoms, $R^1$ is methyl, $R^2$ is alkyl having 1 to 2 carbon atoms, and $R^3$ is phenyl.

6. The compound of claim 5 in which R is methyl, $R^1$ is methyl and $R^2$ is ethyl.

* * * * *